United States Patent Office 3,824,182
Patented July 16, 1974

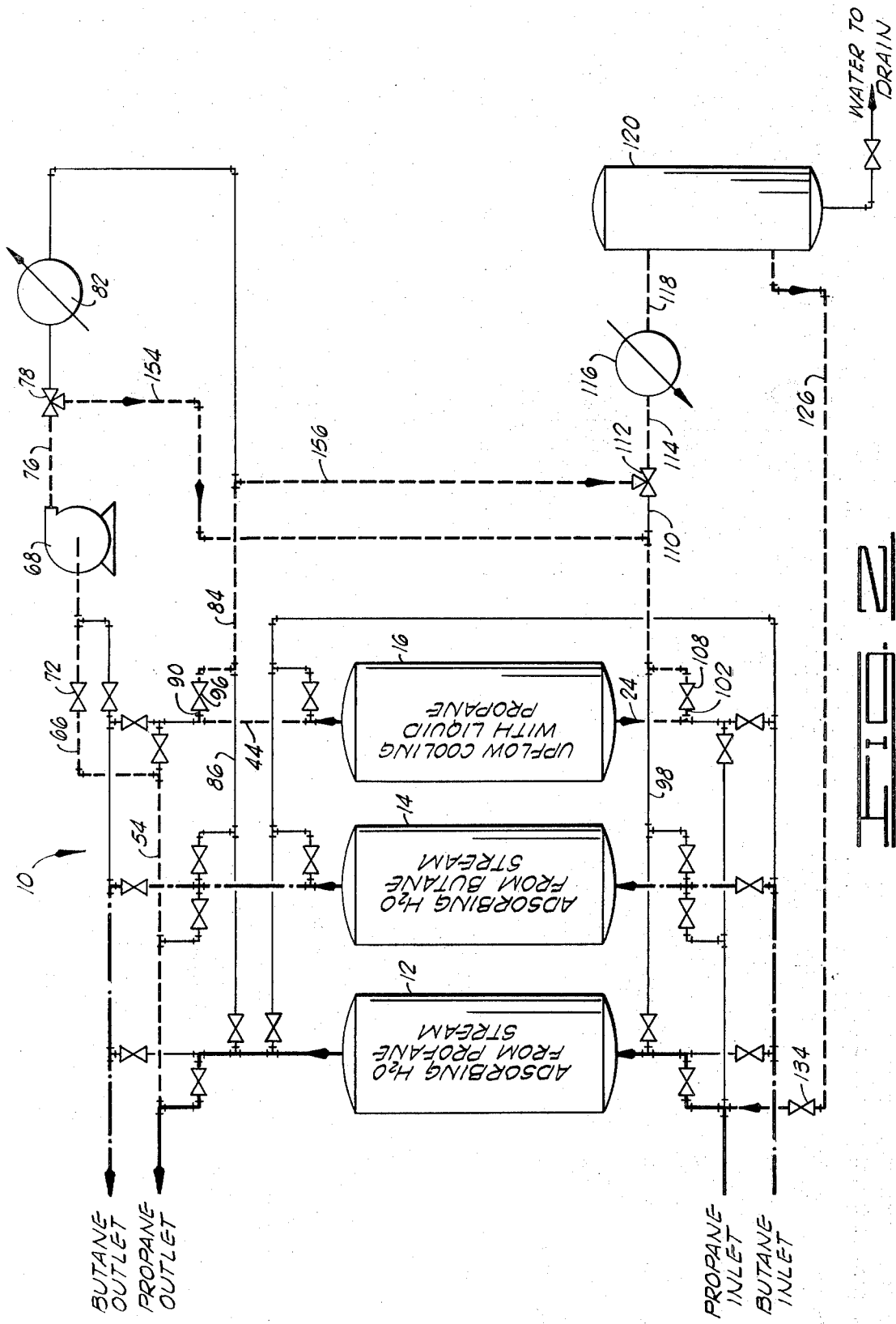

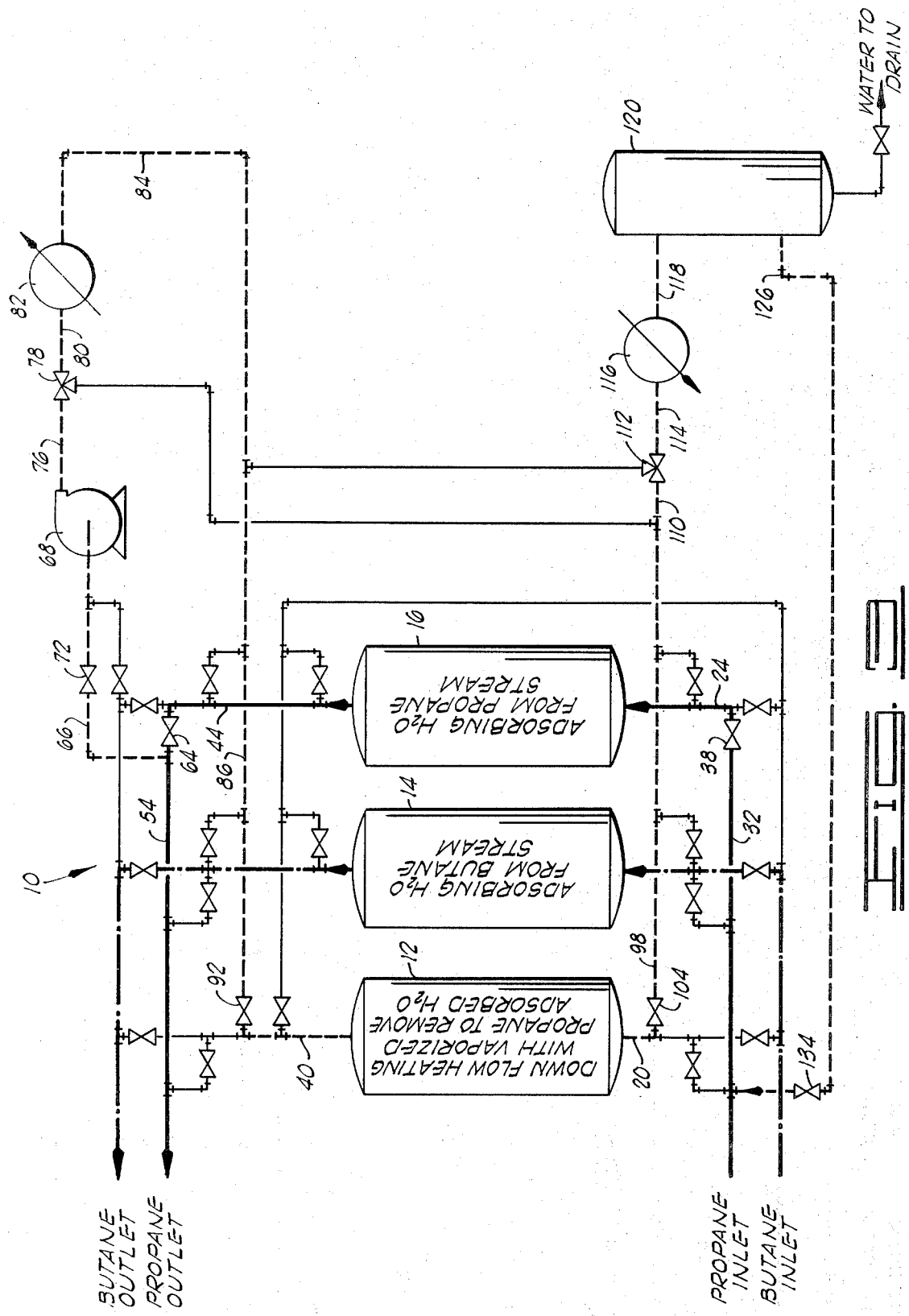

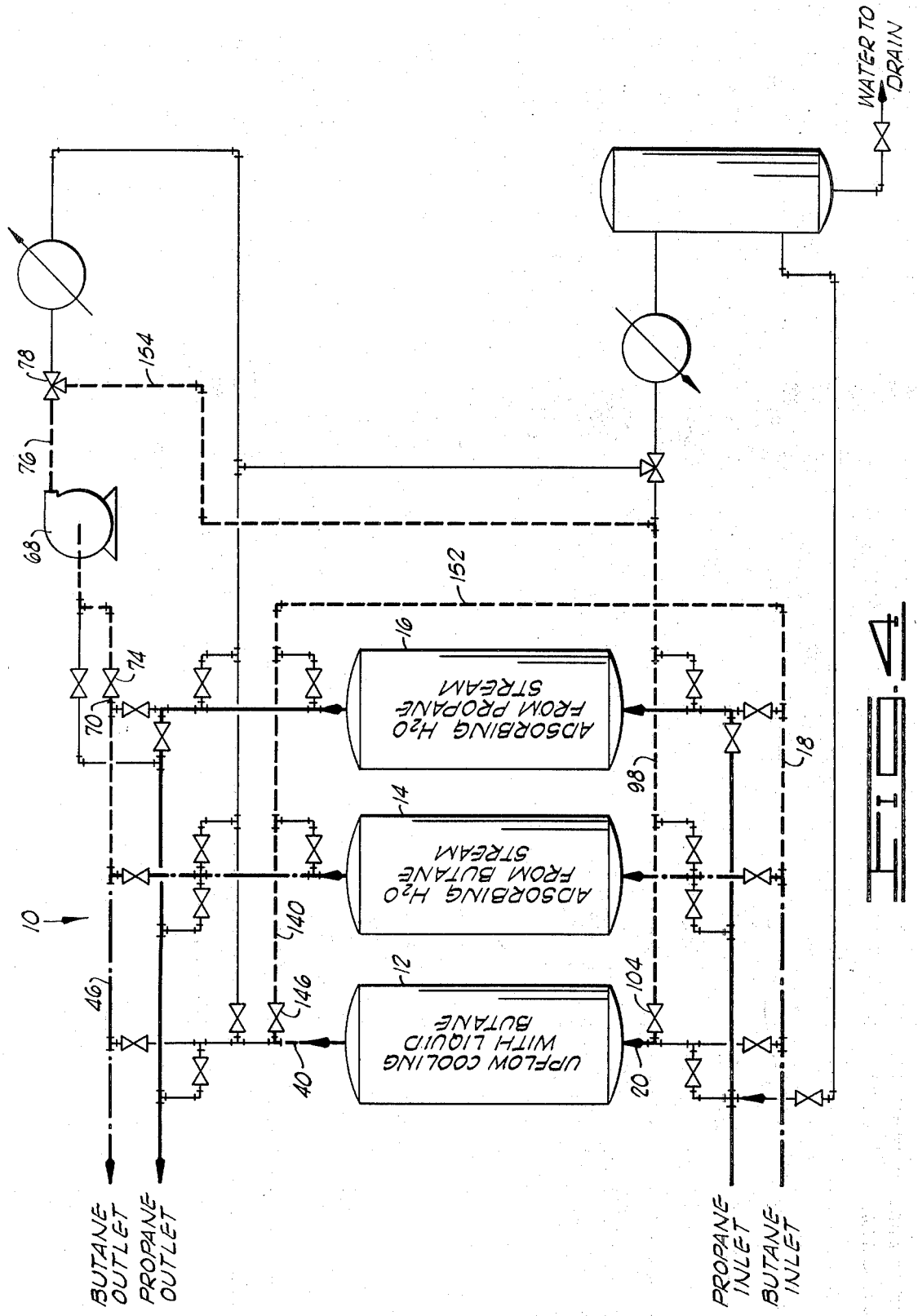

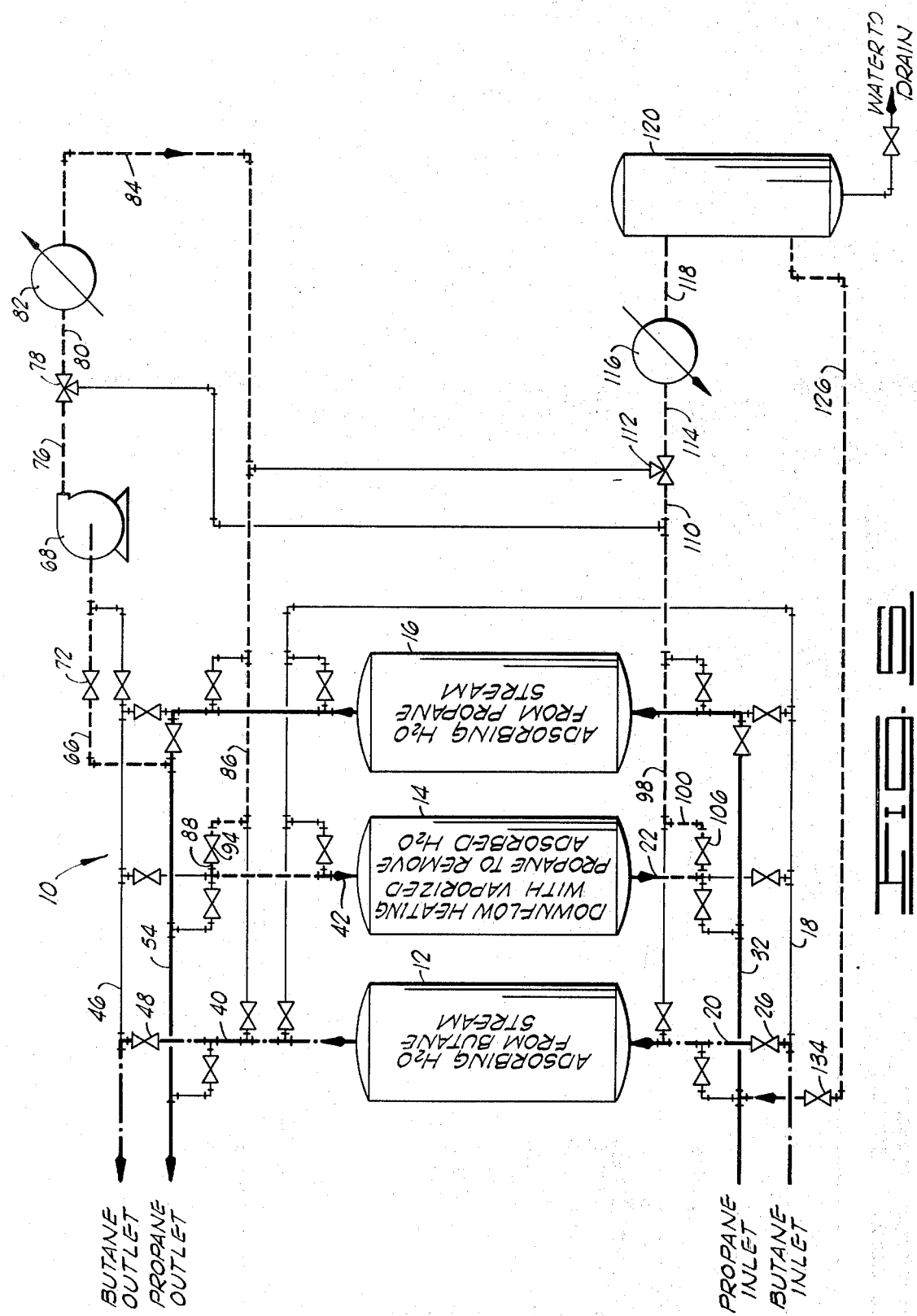

3,824,182
PROCESS FOR SIMULTANEOUSLY REMOVING ADSORBABLE COMPONENTS FROM TWO LIQUID STREAMS
Adrian J. Peterson, Tokyo, Japan, assignor to Black Sivalls & Bryson, Inc., Oklahoma City, Okla.
Continuation-in-part of abandoned application Ser. No. 243,351, Apr. 12, 1972. This application Oct. 30, 1972, Ser. No. 301,881
Int. Cl. C10g 33/04
U.S. Cl. 208—188
15 Claims

ABSTRACT OF THE DISCLOSURE

The present invention relates to an improved process for simultaneously removing desired adsorbable components from two liquid streams. The first of the liquid stream is contacted with a bed of solid adsorbent material so that desired adsorbable components contained therein are adsorbed on the bed. When the bed is partially loaded with such components, the second liquid stream is flowed into contact with another bed of solid adsorbent material so that desired adsorbable components contained therein are adsorbed on the second bed. A third bed of solid adsorbent material is regenerated during the period of time required for the partially loaded bed contacting the first liquid stream to become fully loaded with adsorbed components. The flow pattern of the first liquid stream is changed when the bed in contact therewith becomes loaded so that the first stream flows into contact with the bed just regenerated. Thereafter, the flow patterns of the first and second liquid streams are periodically changed so that the liquid stream contacting the bed just becoming loaded with adsorbed components is flowed into contact with the bed just regenerated and the bed becoming loaded with adsorbed components is regenerated.

CROSS-REFERENCE TO RELATED APPLICATION

This application is a continuation-in-part of application Ser. No. 243,351 filed Apr. 12, 1972, now abandoned

BACKGROUND OF THE INVENTION (1) Field of the Invention

The present invention relates generally to a process for removing adsorbable components from liquid streams, and more particularly, but not by way of limitation, to an improved process for simultaneously removing desired adsorbable components from two liquid streams by contacting the streams with solid adsorbent material.

(2) Description of the Prior Art

Various processes have been developed and used for removing adsorbable components from liquid streams. The term "adsorbable components" is used herein to mean any of a variety of components or mixtures thereof such as hydrocarbon compounds, water, carbon dioxide, hydrogen sulfide, mercaptan compounds, carbon monoxide, etc. One commonly used process comprises flowing the liquid stream containing such adsorbable components into contact with a solid adsorbent material so that the components are adsorbed on the adsorbent material and removed from the liquid stream. The adsorbent material is then regenerated by contacting it with heated vapors so that the adsorbed components are vaporized and removed therefrom. Continuous adsorption processes of this type generally include two or more beds of solid adsorbent material wherein one or more of the beds are used to contact the liquid stream while one or more other beds are simultaneously being regenerated.

Quite often it is desirable to treat two separate liquid streams for the removal of certain adsorbable components contained therein at the same location. For example, in the processing of natural gas in conventional gasoline plants, liquefied propane and butane products are often produced which contain dissolved water. Heretofore, separate adsorption processes of the type described above have been utilized for removing water from each such stream. By the present invention an improved process for simultaneously removing desired adsorbable components from two liquid streams is provided which may be carried out using less expensive apparatus to install and operate than heretofore used processes.

SUMMARY OF THE INVENTION

The present invention relates to a process for simultaneously removing desired adsorbable components from two liquid streams comprising the steps of flowing the first of the liquid streams into contact with one or more beds of solid adsorbent material so that desired adsorbable components contained in the liquid stream are adsorbed on the bed or beds. When the bed or beds contacting the first liquid stream are partially loaded with adsorbed components, the second liquid stream is flowed into contact with one or more other beds of solid adsorbent material so that desirable adsorbable components contained in the second liquid stream are adsorbed on the bed or beds. One or more other beds of solid adsorbent material are regenerated so that adsorbable components previously adsorbed thereon are removed therefrom, the regeneration taking place during the period of time required for the partially loaded bed or beds contacting the first liquid stream to become fully loaded with adsorbed components. The flow pattern of the first liquid stream is changed when the bed or beds in contact therewith become loaded with adsorbed components so that the first stream flows into contact with the bed or beds just regenerated. Thereafter, the flow patterns of the first and second liquid streams are perodically changed so that the liquid stream contacting the bed or beds just becoming loaded with adsorbed components is flowed into contact with the bed or beds just regenerated and the bed or bed just becoming loaded with adsorbed components are regenerated.

It is, therefore, an object of the present invention to provide an improved process for simultaneously removing desired adsorbable components from liquid streams.

A further object of the present invention is the provision of a process for simultaneously removing adsorbable components from two liquid streams which may be carried out in apparatus less expensive to install and operate than that required for carrying out heretofore used processes.

Another object of the present invention is the provision of an improved process for simultaneously removing adsorbable components from two liquid streams wherein a minimum of contamination between the streams takes place without draining of the liquids from the various beds of solid adsorbent material prior to the regeneration thereof.

Other and further objects, features and advantages of the present invention will be apparent from the following description of presently preferred embodiments of the invention, given for the purpose of disclosure and taken in conjunction with the accompanying drawings.

BRIEF DESCRIPTION OF THE DRAWINGS

FIG. 2 is a diagrammatic view of the system of FIG. 1 with the flow patterns of the various streams flowing through the system shown during a second mode of operation, FIG. 3 is a diagrammatic view of the system of FIG. 1 with the flow patterns of the various streams illustrated during a third mode of operation thereof, FIG. 4 is a diagrammatic view of the system of FIG. 1 with the flow patterns of the various streams shown during a fourth mode of operation, and FIG. 5 is a diagrammatic view of the system of FIG. 1 with the flow patterns of the various streams illustrated during a fifth mode of operation.

DESCRIPTION OF PREFERRED EMBODIMENTS

Figure 1:
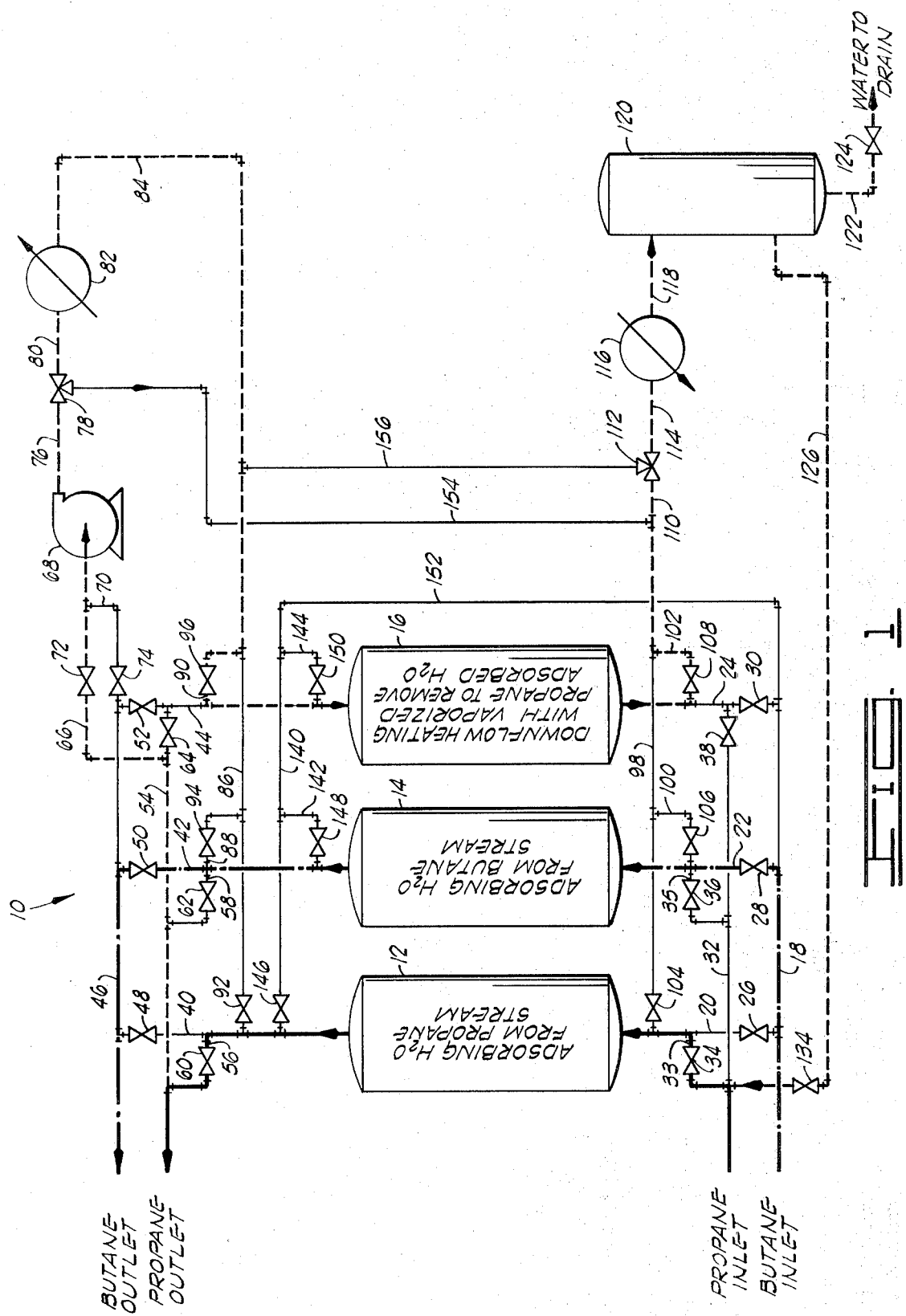
FIG. 1 is a diagrammatic view of a system which may be employed for carrying out the process of the present invention with the flow patterns of various streams flowing through the system illustrated during a first mode of operation.

Referring now to the drawings, and particularly to FIG. 1, a system for carrying out the improved process of the present invention is illustrated and generally designated by the numeral 10. The system 10 is basically comprised of three closed vessels 12, 14 and 16, each of which contains a stationary bed of particulated solid adsorbent material. The adsorbent material utilized must have an affinity for the particular adsorbable components to be adsorbed and must be capable of adsorbing the components from the particular liquid streams to be treated. A variety of such adsorbent materials are commercially available, e.g., activated alumina, activated carbon, silica gel, zeolites, molecular sieves and the like, and are well understood by those skilled in the art.

For purposes of disclosure, the improved process of the present invention and the system 10 for carrying out the process will be described herein the application of simultaneously removing water, i.e., dehydrating two liquid streams, one comprised of liquid propane and the other liquid butane. However, as will be readily understood by those skilled in the art, the process of the present invention may be utilized for removing any of a variety of desired adsorbable components from a variety of liquid streams.

Each of the vessels 12, 14 and 16 include inlet connections which are connected to a butane inlet header 18 by conduits 20, 22 and 24 respectively. Shutoff valves 26, 28 and 30 for selectively routing the butane stream to one of the vessels 12, 14 or 16 are disposed in the conduits 20, 22 and 24, respectively. A propane inlet header 32 is provided to the conduit 24 at one end and connected to the conduits 20 and 22 by conduits 33 and 35, respectively. Shutoff valves 34 and 36 are disposed in the conduits 33 and 35, and a shutoff valve 38 is disposed in the header 32 for selectively routing the inlet propane to one of the vessels 12, 14 or 16.

The outlet connections of the vessels 12, 14 and 16 are connected by conduits 40, 42 and 44 respectively to a butane outlet header 46, and shutoff valves 48, 50 and 52 are disopsed in the conduits 40, 42 and 44 respectively. A propane outlet header 54 is provided connected at one end to the conduit 44 and conduits 56 and 58 connect the header 54 to the conduits 40 and 42 respectively. Shutoff valves 60 and 62 are disposed in the conduits 56 and 58, and a shutoff valve 64 is disposed in the conduit 54 adjacent to the connection thereof with the conduit 44.

The propane outlet header 54 is connected by a conduit 66 to a conventional liquid pump 68. The butane outlet header 46 is connected by a conduit 70 to the conduit 66 and shutoff valves 72 and 74 are disposed in the conduits 66 and 70 for selectively routing either propane or butane to the pump 68. The discharge connection of the pump 68 is connected by a conduit 76 to the common port of a conventional three-way valve 78. One of the outlet ports of the three-way valve 78 is connected by a conduit 154 to the conduit 110 and the other outlet port is connected by a conduit 80 to a conventional heater 82. The heater 82 may be any of a variety of conventional heating apparatus capable of vaporizing and superheating the liquid used for regeneration. For example, a conventional heat exchanger connected to a source of steam is suitable. The outlet connection of the heater 82 is connected by a conduit 84 to a heated vapor inlet header 86. The header 86 is connected to the conduit 40, and a pair of conduits 88 and 90 connect the header 86 to the conduits 42 and 44, respectively. A shutoff valve 92 is disposed in the header 86 adjacent to the connection thereof with the conduit 40, and shutoff valves 94 and 96 are disposed in the conduits 88 and 90.

A vapor outlet header 98 is provided connected to the conduit 20 at one end thereof and conduits 100 and 102 connnect the header 98 to the conduits 22 and 24. A shutoff valve 104 is disposed in the header 98 adjacent to the connection thereof with the conduit 20, and shutoff valves 106 and 108 are disposed in the conduits 100 and 102 respectively.

The vapor outlet header 98 is connected by a conduit 110 to the common port of a conventional three-way valve 112. One of the outlet ports of the three-way valve 112 is connected by a conduit 156 to the conduit 84 and the other outlet port is connected by a conduit 114 to a conventional condenser 116. The condenser 116 can take a variety of forms, but generally is a conventional heat exchanger connnected to a source of cooling water. The outlet connection of the condenser 116 is connected by a conduit 118 to a conventional liquid-liquid separator 120, and water separated within the separator 120 is removed therefrom by way of a conduit 122 and a conventional liquid level control valve 124. The liquid propane outlet connection of the separtaor 120 is connected by a conduit 126 to the propane inlet header 32 and a shutoff valve 134 is disposed in the conduit 126.

A cooling liquid outlet header 140 is provided connected to the conduit 40. Conduits 142 and 144 connect the header 140 to the conduits 42 and 44, and shutoff valves 146 and 150 are disposed therein. A shutoff valve 146 is disposed in the header 140 adjacent to the connection thereof with the conduit 40. The header 140 is connected by a conduit 152 to the butane stream inlet header 18.

OPERATION OF THE SYSTEM 10

As will be described in detail hereinbelow, the system 10 is sequentially operated so that the two liquid streams are continuously dehydrated. That is, the first liquid stream is caused to flow through one of the beds of absorbent material so that water is adsorbed on the bed and removed from the stream. The second liquid stream is caused to flow through another bed of adsorbent material so that water is removed therefrom, and a third bed of adsorbent material is regenerated by contacting it with heated vapors to vaporize and remove adsorbed water therefrom and then contacting it with cooling liquid so that the bed is cooled preparatory to contacting the first or second streams. By the present invention the cooling of the bed being regenerated is accomplished with a portion of the liquid stream to be next switched into the regenerated bed. This insures that the stream next switched into the bed is not contaminated and obviates the necessity of draining the regenerated bed prior to switching. Further, by the process of the present invention only three beds of adsorbent material and one circuit of regeneration apparatus are required.

The flow patterns of the liquid streams being dehydrated, i.e., the streams from which the adsorbable component water is being removed, and the vapor and cooling streams used to regenerate one of the beds are periodically changed so that the liquid streams are sequentially and continuously contacted by a regenerated bed of adsorbent material and water is continuously removed therefrom. The changing of the flow patterns of the various streams may be accomplished manually, or the various shutoff valves of the system 10 may be opened and closed automatically in a conventional manner. That is, the shutoff valves may be controlled by a time cycle, temperature or other controller so that the flow patterns are switched in a predetermined manner. By the present invention, the system 10 is operated in twelve different modes each complete cycle. That is, the flow patterns of the various streams flowing through the system 10 are the same in the thirteenth mode of operation as they were in the first mode of operation, etc. Stated another way, if the system 10 is designed for a 12 hour regeneration time and a 24 hour adsorbing time, one cycle is completed every 72 hours.

Referring to the drawings, the various modes of operation of the system 10 are illustrated. That is, the flow pattern of the first liquid stream (propane) is shown by heavy solid lines, the flow pattern of the second liquid stream (butane) is shown by alternating long and short dashed lines and the flow pattern of the streams passing through the bed being regenerated are shown in dashed lines. Referring specifically to FIG. 1, the inlet stream of liquid propane is conducted from the inlet header 32 to the vessel 12 by way of the conduits 33 and 20 and the shutoff valve 34. The liquid propane passes upwardly through the vessel 12 thereby contacting the bed of adsorbent material contained therein and as a result, water contained in the propane is adsorbed on the bed and removed from the propane. The resulting dehydrated propane exits the vessel 12 and passes into the propane outlet header 54 by way of the conduits 40 and 56 and shutoff valve 60. From the outlet header 54, the dehydrated propane stream is conducted to a point of use or storage.

The stream of butane to be dehydrated is conducted from the butane inlet header 18 to the vessel 14 by way of the conduit 22 and shutoff valve 28. While flowing through the vessel 14 the butane contacts the bed of adsorbent material and is dehydrated thereby. The resulting dehydrated stream exits the vessel 14 by way of the conduit 42 and the valve 50, and passes into the butane outlet header 46 from where it is conducted to storage or a point of use.

During the first mode of operation of the system 10 as shown in FIG. 1, the bed of adsorbent material within the vessel 16 is partially regenerated. That is, the bed is contacted by heated propane vapor so that adsorbed water is vaporized and removed therefrom. Specifically, a portion of the stream of dehydrated propane passing into the header 54 from the vessel 12 is diverted by way of the conduit 66 and valve 72 into the pump 68. The pump 68 causes the propane to flow through the conduits 76 and 80, and three-way valve 78 into the heater 82. While flowing through the heater 82, the propane is vaporized and superheated to a temperature which, upon contact of the vapors with the bed of adsorbent material contained in the vessel 16 causes the vaporization of water absorbed thereon. Generally, a vapor temperature in the range of about 400° F. to 600° F. is adequate. From the heater 82, the heated propane vapors flow by way of the conduit 84, the conduit 90, the shutoff valve 96 and the conduit 44 into the vessel 16. The heated propane vapors pass downwardly through the bed and water previously adsorbed thereon is vaporized and removed from the vessel 16 with the propane vapors. The resulting stream of propane and water vapors exit the vessel 16 by way of the conduits 24 and 102 and the shutoff valve 108, and flow into the header 98. From the header 98, the propane and water vapors pass by way of the conduits 110 and 114 and three-way valve 112 into the condenser 116. While flowing through the condenser 116 the propane and water vapors are condensed and the resulting liquid mixture flows by way of the conduit 118 into the liquid-liquid separator 120. Water separated from the liquid propane in a conventional manner in the separator 120 is removed therefrom by way of the conduit 122 and liquid level control valve 124. The separated liquid propane flows by way of the conduit 126 and shutoff valve 134 back into the inlet propane header 32.

Referring now to FIG. 2, the second mode of operation of the system 10 is illustrated. The operation of the system 10 in the second mode is similar to the first mode except that the bed of adsorbent material being regenerated is cooled preparatory to contacting the inlet stream of liquid propane. That is, the bed of adsorbent material within the vessel 16 is cooled by contacting it with a portion of the dehydrated liquid propane stream passing through the header 54. Specifically, a portion of the dehydrated liquid propane is conducted by way of the conduit 66 and valve 72 to the pump 68. From the pump 68, the liquid propane is pumped through the conduit 76, the three-way valve 78 and the conduit 154 into the header 98. From the header 98, the liquid propane passes into the vessel 16 by way of the conduit 102, the valve 108 and the conduit 24. The liquid propane cools the adsorbent material as it passes upwardly through the bed contained in the vessel 16 and exits the vessel 16 by way of the conduit 44, the conduit 90, valve 96 and the header 86. From the header 86, the propane passes by way of the conduit 84, the three-way valve 112, the conduit 156 and the conduit 114 into the condenser 116. Any propane that is vaporized during passage through the adsorbent material being cooled is condensed as it passes through the condenser 116. From the condenser 116, the liquid propane passes by way of the conduit 118 into the separator 120, and from the separator 120 the propane is returned to the inlet header 32 by way of the conduit 126 and valve 134.

At the end of the second mode of operation, the bed of adsorbent material within the vessel 16 has been regenerated and cooled, the bed of adsorbent material contacting the stream of butane within the vessel 14 is partially loaded with adsorbed water, and the bed of adsorbent material within the vessel 12 contacting the inlet stream of propane is loaded with adsorbed water. That is, the bed of absorbent material within the vessel 12 has contacted the inlet stream of propane for a period of time whereby the bed has reached its design capacity of adsorbed water. At this point the operation of the system 10 is changed to a third mode illustrated in FIG. 3. That is, the flow pattern of the liquid propane stream is changed so that the stream passes from the inlet header 32 into the just regenerated bed of adsorbent material within the vessel 16 by way of the valve 38 and conduit 24. The resulting dehydrated propane stream exits the vessel 16 by way of the conduit 44, the valve 64, and flows into the outlet header 54.

A portion of the dehydrated propane stream is diverted from the header 54 by way of the conduit 66 and valve 72 to the pump 68. Liquid propane is pumped by the pump 68 into the heater 82 by way of the conduit 76, the valve 78 and the conduit 80. While passing through the heater 82 the liquid propane is vaporized and superheated, and the resulting heated vapors are conducted by the conduit 84 to the header 86. From the header 86 the heated vapors pass by way of the valve 92 and the conduit 40 into the vesel 12. The propane vapors pass downwardly through the bed of adsorbent material within the vessel 12 thereby causing water previously adsorbed thereon to be removed therefrom, and the resulting mixture of propane and water vapor exits the vessel 12 by way of the conduit 20, the valve 104 and the header 98. From the header 98 the vapors are conducted to the condenser 116 by the conduit 110, the three-way valve 112 and the conduit 114. The liquids condensed in the condenser 116 pass by way of the conduit 118 into the separator 120 wherein water is separated and removed from the propane. Propane exits the separator 120 by way of the conduit 126 and is returned to the propane inlet header 32 by way of the valve 134.

Referring now to FIG. 4, the fourth mode of operation of the system 10 is illustrated. During this mode of operation the bed of adsorbent material contained within the vessel 12 is cooled by contacting it with liquid butane. As will be understood, the bed of adsorbent material within the vessel 12 was heated during the just previous mode of operation (FIG. 3), and since the inlet stream of butane will be next flowed through the vessel 12, the adsorbent material is cooled with liquid butane. This is accomplished by diverting a portion of the dehydrated butane stream passing through the butane outlet header 46 to the pump 68 by way of the conduit 70 and the valve 74. The liquid butane is pumped by the pump 68 through the conduit 76, the three-way valve 78, and the conduit 154 into the header 98. The liquid butane passes from the header 98 into the vessel 12 by way of the valve 104 and the conduit 20. While passing through the vessel 12 the liquid butane cools the bed of adsorbent material contained therein and then by way of the conduit 40 and valve 146 into the header 140. From the header 140 the butane is conducted by the conduit 152 back to the butane inlet header 18.

At the end of the fourth mode of operation of the system 10, the bed of adsorbent material within the vessel 12 has been regenerated and cooled. The bed of adsorbent material within the vessel 14 contacting the inlet butane stream is loaded with adsorbed water and the bed of adsorbent material contacting the stream of propane within the vessel 16 is partially loaded with adsorbed water. At this time, the flow patterns of the various streams are changed so that the system 10 is operated in a fifth mode as shown in FIG. 5. Specifically, the inlet butane stream flows from the inlet header 18 into contact with the just regenerated bed of adsorbent material within the vessel 12 by way of the valve 26 and the conduit 20. The resulting dehydrated stream of butane exits the vessel 12 by way of the conduit 40 and valve 48 and passes into the butane outlet header 46.

A portion of the dehydrated propane stream passing through the propane outlet header 54 is diverted by way of the conduit 66 and valve 72 to the pump 68. The propane is pumped by the pump 68 through the heater 82 by way of the conduits 76 and 80 and the three-way valve 78. While passing through the heater 82, the propane is vaporized and superheated and the resulting heated vapors are conducted to the header 86 by way of the conduit 84. From the header 86 the heated vapors pass by way of the conduit 88, the valve 94 and the conduit 42 into the vessel 14. The bed of adsorbent material within the vessel 14 is heated by the propane vapors and adsorbed water removed therefrom. The resulting propane and water vapor mixture exits the vessel 14 by way of the conduit 22, the conduit 100 and the valve 106 and passes into the header 98. From the header 98 the propane and water vapors pass by way of the conduit 110, the three-way valve 112 and the conduit 114 into the condenser 116, and the resulting liquid mixture passes by way of the conduit 118 into the separator 120. Separated liquid propane is removed from the separator 120 by way of the conduit 126 and returned to the propane inlet header 32 by way of the valve 134.

As will be understood, during the sixth mode of operation of the system 10 (not shown), the bed of adsorbent within the vessel 14 is cooled with propane, and at the end of the sixth mode, one-half of a cycle is completed. The length of each mode of operation and cycle will, of course, depend on a variety of design and economic factors. However, by the present invention the regeneration of a bed of adsorbent material including the heating and cooling thereof is carried out during one-half of the adsorbing period for each bed. Further, the adsorbing periods of the beds contacting the two liquid streams being dehydrated, i.e., the period of time from the start of contact with a liquid stream being dehydrated to when the bed becomes loaded with adsorbed water are staggered by one-half of an adsorbing period.

In order to present a clear understanding of the adsorbent bed and valve sequence of the system 10, the sequence is shown in Table I below for the first twelve operating modes (one complete cycle).

TABLE I.—ADSORBENT BED AND VALVE SEQUENCE FOR SYSTEM 10

(Cycle 1)

| | Adsorbent bed vessel | | | | | | | | | | | |
|---|---|---|---|---|---|---|---|---|---|---|---|---|
| | Mode 1 | Mode 2 | Mode 3 | Mode 4 | Mode 5 | Mode 6 | Mode 7 | Mode 8 | Mode 9 | Mode 10 | Mode 11 | Mode 12 |
| | Adsorbing propane | Adsorbing propane | Heating | Cooling butane | Adsorbing butane | Adsorbing butane | Adsorbing butane | Adsorbing butane | Heating | Cooling propane | Adsorbing propane | Adsorbing propane |
| | Adsorbing butane | Adsorbing butane | Adsorbing butane | Adsorbing butane | Heating | Cooling propane | Adsorbing propane | Adsorbing propane | Adsorbing propane | Adsorbing propane | Heating | Cooling butane |
| | Heating | Cooling propane | Adsorbing propane | Adsorbing propane | Adsorbing propane | Heating | Cooling butane | Adsorbing butane | Adsorbing butane | Adsorbing butane | Adsorbing butane | Adsorbing butane |
| Valves: | | | | | | | | | | | | |
| 26 | C | C | C | C | O | O | O | O | C | C | C | C |
| 28 | O | O | O | O | C | C | C | C | O | O | O | O |
| 30 | C | C | C | C | C | C | C | C | O | O | O | O |
| 34 | O | O | C | C | C | C | C | C | C | C | O | O |
| 36 | C | C | C | C | C | C | O | O | O | O | O | C |
| 38 | C | C | O | O | O | O | C | C | C | C | C | C |
| 48 | C | C | C | C | O | O | O | O | C | C | C | C |
| 50 | O | O | O | O | C | C | C | C | O | O | O | O |
| 52 | C | C | C | C | C | C | C | C | O | O | O | O |
| 60 | O | O | C | C | C | C | C | C | C | C | O | O |
| 62 | C | C | C | C | C | C | O | O | O | O | C | C |
| 64 | C | C | O | O | O | O | C | C | C | C | C | C |
| 72 | O | O | O | O | O | O | O | O | O | O | O | O |
| 74 | C | C | C | C | C | C | C | C | C | C | C | C |
| 78 | S | A | S | A | S | A | S | A | S | A | S | A |
| 92 | C | C | O | O | O | O | C | C | C | C | C | C |
| 94 | C | C | C | C | O | O | O | O | C | C | O | O |
| 96 | O | O | C | C | C | C | O | O | O | O | C | C |
| 104 | C | C | O | O | O | O | C | C | O | O | C | C |
| 106 | C | C | C | C | O | O | O | O | C | C | O | O |
| 108 | O | O | C | C | C | C | O | O | O | O | C | C |

NOTE.—C=Closed; O=Open; A=3-way valve open angle; S=3-way valve open straight.

As will be understood by those skilled in the art, any number of beds of adsorbent material may be utilized in carrying out the improved process of the present invention and a variety of systems and arrangements of apparatus for regenerating the beds may be used. In addition, as stated above any of a variety of liquid streams may be treated in accordance with the process of the present invention for the removal or separation of a variety of desired adsorbable components contained in the liquid streams. Further, the shutoff valves may be two-way or three-way or combinations thereof and may be controlled manually or automatically. If the valve control is automatic, any conventional hydraulic, pneumatic or electric operated valves may be used in conjunction with one or more conventional cycle controllers.

What is claimed is:

1. A process for simultaneously removing adsorbable components from a plurality of liquid streams, wherein each of said streams is contacting separate beds of solid adsorbent material, said process comprising the steps of:
   (a) flowing a first of said liquid streams into contact with one or more first beds of solid adsorbent material so that adsorbable components contained in said first liquid stream are adsorbed on said first bed or beds;
   (b) when said first bed or beds contacting the first liquid stream are partially loaded with adsorbed components, flowing a second of said liquid streams into contact with one or more second beds of solid adsorbent material so that adsorbable components contained in said second liquid stream are adsorbed on said second bed or beds;
   (c) regenerating one or more third beds of solid adsorbent material which have become fully loaded with adsorbed components and which are no longer in contact with a liquid stream so that components adsorbed thereon are being removed therefrom, the regeneration of said one or more third beds taking place during the period of time required for said partially-loaded first bed or beds containing said first liquid stream to become fully loaded with adsorbed components;
   (d) changing the flow pattern of said first liquid stream when said first bed or beds in contact therewith become fully loaded with adsorbed components so that said first liquid stream flows into contact with said third bed or beds which have just been regenerated and said one or more first beds which have become fully loaded with adsorbed components are placed on regeneration;
   (e) thereafter periodically changing the flow patterns of said first and said second liquid streams so that the liquid stream contacting the bed or beds which have just become fully loaded with adsorbed components is flowed into contact with said bed or beds which have just been regenerated and said bed or beds which have just become fully loaded with adsorbed components are placed on regeneration.

2. The process of claim 1 wherein step (c) comprises:
   heating a portion of the first liquid stream so that heated vapors are generated;
   flowing said heated vapors into contact with said bed or beds being regenerated so that adsorbable components previously adsorbed thereon are vaporized and removed therefrom; and
   then flowing a portion of the liquid stream which is to contact said regenerated bed or beds in accordance with step (d) into contact with said bed or beds being regenerated so that said bed or beds are cooled.

3. The process of claim 2 which is further characterized to include the steps of:
   condensing the mixture of heated vapors and vaporized adsorbable components removed from said bed or beds;
   separating said adsorbable components from the condensed liquid; and
   returning said condensed liquid to said first liquid stream.

4. The process of claim 3 which is further characterized to include the step of:
   returning the liquid used to cool said bed or beds being regenerated to said liquid stream that contacts said regenerated bed or beds in accordance with step (d).

5. A process for simultaneously dehydrating two liquid streams, wherein each of said streams is contacting separate beds of adsorbent material, said process comprising the steps of:
   (a) flowing a first of said liquid streams into contact with one or more first beds of solid adsorbent material so that water contained in said first liquid stream is adsorbed on said first bed or beds;
   (b) when said first bed or beds contacting the first liquid stream are partially loaded with adsorbed water, flowing a second of said liquid streams into contact with one or more second beds of solid adsorbent material so that water contained in said second liquid stream is adsorbed on said second bed or beds;
   (c) regenerating one or more third beds of solid adsorbent material which have become fully loaded with adsorbed water and which are no longer in contact with a liquid stream so that water adsorbed thereon is being removed therefrom, the regeneration of said one or more third beds taking place during the period of time required for said partially-loaded first bed or beds contacting said first liquid stream to become fully loaded with adsorbed water;
   (d) changing the flow pattern of said first liquid stream when said first bed or beds in contact therewith become fully loaded with adsorbed water so that said first liquid stream flows into contact with said third bed or beds which have just been regenerated and said one or more first beds which have become fully loaded with adsorbed water are placed on regeneration; and
   (e) thereafter periodically changing the flow patterns of said first and said second liquid streams so that the liquid stream contacting the bed or beds which have just become fully loaded with adsorbed water is flowed into contact with said bed or beds which have just been regenerated and said bed or beds which have just become fully loaded with adsorbed water are placed on regeneration.

6. The process of claim 5 wherein step (c) comprises:
   heating a portion of the first liquid stream so that heated vapors are generated;
   flowing said heated vapors into contact with said bed or beds being regenerated so that water previously adsorbed thereon is vaporized and removed therefrom; and
   then flowing a portion of the liquid stream which is to contact said regenerated bed or beds in accordance with step (d) into contact with said bed or beds being regenerated so that said bed or beds are cooled.

7. The process of claim 6 which is further characterized to include the steps of:
   condensing the mixture of heated vapors and vaporized water removed from said bed or beds;
   separating water from the condensed liquid; and
   returning said condensed liquid to said first liquid stream.

8. The process of claim 7 which is further characterized to include the step of returning the liquid used to cool said bed or beds being regenerated to said liquid stream that contacts said regenerated bed or beds in accordance with step (d).

9. The process of claim 8 wherein said first liquid stream is liquefied propane and said second liquid stream is liquefied butane.

10. The process of claim 9 wherein the adsorbent material is selected from the group consisting of activated alumina, activated carbon and silica gel.

11. A process for simultaneously dehydrating a stream of liquid propane and a stream of liquid butane, wherein each of said streams is contacting a separate bed of adsorbent material, said process comprising the steps of:
   (a) flowing said stream of liquid propane into contact with a first bed of solid adsorbent material so that water contained in said stream of propane is adsorbed on said first bed;
   (b) when said first bed being contacted with said stream of propane is partially loaded with adsorbed water, flowing said stream of liquid butane into contact with a second bed of solid adsorbent material so that water contained in said stream of butane is adsorbed on said second bed;

(c) regenerating a third bed of solid adsorbent material which has become fully loaded with water and which is no longer in contact with a liquid stream so that water adsorbed thereon is being removed therefrom, the regeneration of said third bed taking place during the period of time required for said partially-loaded first bed contacting said stream of propane to become fully loaded with adsorbed water;

(d) changing the flow pattern of said stream of liquid propane when said first bed in contact therewith becomes fully loaded with adsorbed water so that said stream of propane is flowed into contact with said third bed which has just been regenerated and said first bed which has become fully loaded with adsorbed water is placed on regeneration; and (e) thereafter periodically changing the flow patterns of said streams of liquid propane and butane so that the stream contacting the bed which has just become fully loaded with adsorbed water is flowed into contact with the bed which has just been regenerated and said bed which has just become fully loaded with adsorbed water is placed on regeneration.

12. The process of claim 11 wherein step (c) comprises: heating a portion of the stream of liquid propane so that heated propane vapors are generated;

flowing said heated propane vapors into contact with the bed being regenerated so that water previously adsorbed thereon is vaporized and removed therefrom; and then flowing into contact with the bed being regenerated a portion of the stream of liquid propane or butane which is to contact said regenerated bed in accordance with step (d) into contact with said bed being regenerated so that said bed is cooled.

13. The process of claim 12 which is further characterized to include the steps of:

condensing the mixture of heated propane vapors and vaporized water removed from the bed;

separating water from the condensed propane; and returning said condensed propane to said stream of liquid propane.

14. The method of claim 13 wherein said condensed propane is returned to said stream of liquid propane before said stream of liquid propane is flowed into contact with a bed of adsorbent material in accordance with step (a) so that water contained in the condensed stream of propane is adsorbed on said bed and removed therefrom.

15. The process of claim 14 which is further characterized to include the step of returning the liquid propane or butane used to cool the bed being regenerated to one of the streams of liquid propane or butane.

References Cited

UNITED STATES PATENTS

| | | | |
|---|---|---|---|
| 2,938,864 | 5/1960 | Fleck et al. | 208—310 |
| 3,288,705 | 11/1966 | Humphries | 208—310 |
| 2,914,591 | 11/1959 | Brown | 260—676 MS |
| 2,968,607 | 1/1961 | Higley | 260—676 AD |
| 3,421,984 | 1/1969 | Jensen et al. | 260—676 AD |
| 3,384,601 | 5/1968 | Price | 208—188 |

DELBERT E. GANTZ, Primary Examiner

G. J. CRASANAKIS, Assistant Examiner

U.S. Cl. X.R.

252—411; 260—676 R